United States Patent [19]

Machida

[11] Patent Number: 4,496,243

[45] Date of Patent: Jan. 29, 1985

[54] CONTACT LENS HOLDER

[75] Inventor: Takeshi Machida, Tokyo, Japan

[73] Assignee: Asahi Kogaku Kogyo Kabushiki Kaisha, Tokyo, Japan

[21] Appl. No.: 363,153

[22] Filed: Mar. 29, 1982

[30] Foreign Application Priority Data

May 29, 1981 [JP] Japan .............................. 56-78564[U]

[51] Int. Cl.³ ............................................ G01N 21/01
[52] U.S. Cl. ..................................... 356/244; 356/125
[58] Field of Search ........................ 356/124, 244, 125; 206/5.1; 220/82 A

[56] References Cited

U.S. PATENT DOCUMENTS

| 3,695,280 | 10/1972 | Sturgeon | 206/5.1 |
| 3,904,276 | 9/1975 | Whitaker et al. | 350/252 |
| 3,985,445 | 10/1976 | Tagnon | 356/125 |
| 4,277,172 | 7/1981 | Richards | 356/244 |

FOREIGN PATENT DOCUMENTS 0052021  4/1980  Japan ................................. 356/244

Primary Examiner—Vincent P. McGraw

[57] ABSTRACT

A contact lens holder for use in a lens meter comprises an upper cover and a casing which are hinged together and which have first and second axially aligned openings, respectively, for passage therethrough a beam of light from the lens meter. The casing has an annular wall defining the second opening and an annular projection surrounding the annular wall in spaced relation. A contact lens is placed on the annular wall with a concave side of the lens facing the second opening and a peripheral edge of the lens held against an inner peripheral surface of the annular projection. Thus, the contact lens is prevented from being wobbled laterally of the annular projection. The upper cover has a plurality of angularly spaced resilient tongues attached thereto as cantilevers and extending radially inwardly toward the center of the upper cover. When the upper cover is closed over the casing, the distal or free end portions of the resilient tongues are resiliently pressed against a convex surface of the lens to hold the latter against wobbling movement axially of the first and second openings. The contact lens can thus be held securely in position in the contact lens holder to allow the lens meter to make measurements with precision.

2 Claims, 2 Drawing Figures

Fig. 1.
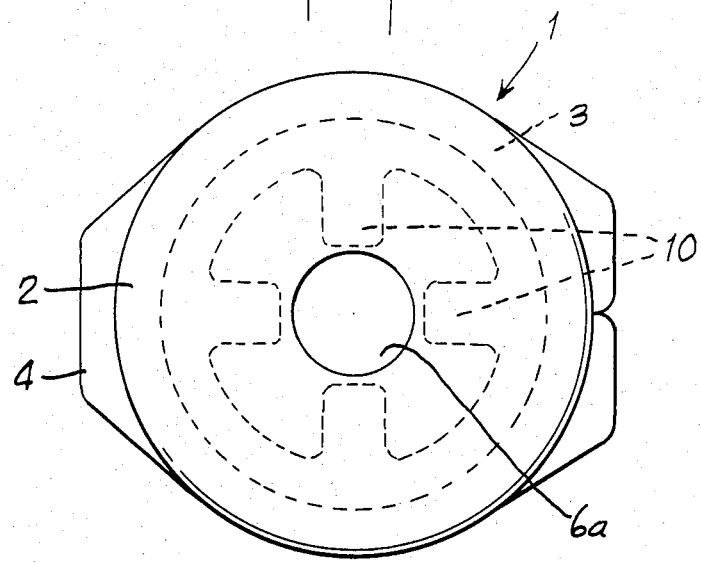
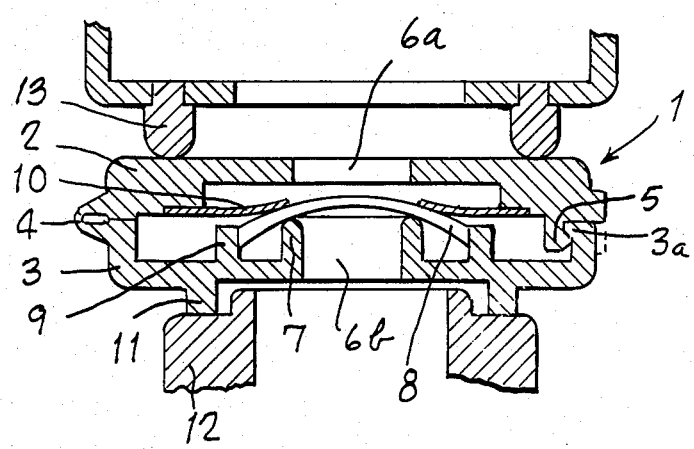
Fig. 2.

CONTACT LENS HOLDER

BACKGROUND OF THE INVENTION

The present invention relates to a contact lens holder for use in measurement of the power of contact lenses.

For measuring the power of a contact lens, particularly a hard contact lens, the lens is placed on a lens support in an optical measurement machine known as a lens meter, and is adjusted in position to bring the center of the contact lens into alignment with the optical axis of the lens meter. Since contact lenses are quite small in size, however, it is tedious and time-consuming to set a contact lens in a desired position on the lens support.

It has been customary to hold the contact lens down against the lens support by hand during the process of measurement, or to place the contact lens on the lens support and allow the lens to be positioned by gravity. The manual attempt to keep the lens in place has been disadvantageous in that the contact lens is too small to be handled by hand for neat installation on the support, resulting in an erroneous measurement of the power of the contact lens, and the contact lens to undergo warpage under undue forces applied, with the consequence that the measurement image of the contact lens will be distorted. One of the operator's hand is fully occupied to hold the contact lens, and hence is not available for other operations throughout measurement. The gravity-supported contact lens is apt to drop easily off the lens support when subjected to small shocks or vibrations or even weak air streams. The lens support is required to be maintained horizontally at all times, a procedure which has made measuring processes highly complex.

SUMMARY OF THE INVENTION

It is an object of the present invention to provide a holder for supporting a contact lens securely in position without warpage or distortion during measurement of the power thereof.

Another object of the present invention is to provide a contact lens holder which will permit lens meters to effect measurements with ease and precision.

According to the present invention, a contact lens holder comprises an upper cover and a casing which are hinged together and have axially aligned central openings, respectively, for passage therethrough of a beam of light emitted from a lens meter in which the contact lens holder is to be installed. The casing has on its bottom on annular wall defining the opening thereof for supporting thereon a contact lens to be measured by the lens meter, and an annular projection surrounding the annular wall in spaced relation. When the contact lens is placed on the annular wall with a concave side of the lens facing the bottom of the casing, a peripheral edge of the contactlens is held against inner peripheral surface of the annular projection. Thus, the contact lens is prevented from being wobbled laterally of the annular projection. The upper cover has a plurality of resilient tongues attached thereto at angularly spaced positions in a cantilevered manner and having distal or free ends extending radially inwardly toward the center of the upper cover. When the upper cover is turned over the casing to close the latter, the resilient tongues are resiliently pressed at their free ends against a convex surface of the contact lens mounted in the casing, thereby preventing the contact lens from being wobbled vertically or axially of the openings.

The above and other objects, features, and advantages of the present invention will become more apparent from the following description when taken in conjunction with the accompanying drawings in which a preferred embodiment of the invention is shown by way of example.

BRIEF DESCRIPTION OF THE DRAWINGS

FIG. 1 is a plan view of a contact lens holder according to the present invention; and FIG. 2 is an axial cross-sectional view of the contact lens holder shown in FIG. 1, as interposed between a lens presser and a lens support.

DESCRIPTION OF THE PREFERRED EMBODIMENT

As shown in FIGS. 1 and 2, a contact lens holder 1 comprises an upper cover 2 and a casing 3 which are openably joined to each other by a hinge 4. The upper cover 2 has a hook 5 which is positioned in diametrically opposite relation to the hinge 4 and which is snappingly engageable releasably with a locking projection 3a on the casing 3. The upper cover 2 has a central opening 6a, and the casing 3 has in its bottom a central opening 6b coaxial with the central opening 6a, the central openings 6a, 6b serving to allow a beam of light emitted from a lens meter (not shown) to pass therethrough for measurement of a contact lens.

The central opening 6b is defined by an annular wall 7 on which a contact lens 8 to be measured is supported with its concave side to be fitted over the cornea of an eye of a wearer being directed downwardly toward the opening 6b or the bottom of the casing 3. The annular wall 7 is surrounded in spaced relation by an annular projection 9. The contact lens 8 as mounted on the annular wall 7 has its peripheral edge held against an inner peripheral surface of the annular projection 9. Thus, the contact lens 8 which is installed on the casing 3 is prevented by the annular projection 9 from being wobbled laterally of the annular projection 9.

The upper cover 2 has on its underside a plurality of resilient tongues 10 attached thereto and extending radially inwardly toward the center of the upper cover 2 as cantilevers. When the upper cover 2 is closed over the casing 3 with the test contact lens 8 mounted thereon, the distal or free end portions of the resilient tongues 10 are pressed resiliently against an upper convex surface of the contact lens 8 to hold the latter against vertical movement between the upper cover 2 and the casing 3 axially of the openings 6a, 6b. The casing 3 has on its bottom an annular leg 11 projecting downwardly away from the upper cover 2.

The contact lens 8 will be installed in the lens holder 1 as follows: With the upper cover 2 open, the contact lens 8 to be tested is placed on the annular wall 7 on the bottom of the casing 3 with the convex side of the lens 8 facing downwardly and the peripheral edge of the lens 8 held against the inner peripheral surface of the annular projection 9. The contact lens 8 thus positioned is prevented from being laterally shifted or wobbled. Then, the upper cover 2 is turned over the casing 3 until the hook 5 snaps around the locking projection 3a on the casing 3. The resilient tongues 10 are resiliently pressed against the contact lens 8 to hold the latter against vertical wobbling motion. The contact lens holder 1 with the contact lens 8 held therein is placed in the lens meter with the annular leg 11 disposed on a lens support 12 of the lens meter. The lens holder 1 is then positionally adjusted in the lateral direction with respect to the lens support 12 until the center of the contact lens 8 housed in the contact lens holder 1 is aligned with a beam of light emitted by the lens meter and passing through the centeral openings 6a, 6b in the upper cover 2 and the casing 3. When the center of the contact lens 8 is in alignment with the beam of light, a lens presser 13 of the lens meter is brought down into engagement with the upper cover 2 so that the contact lens holder 1 will be sandwiched securely in position between the lens presser 13 and the lens support 12. Then, necessary measuring operation can be effected on the contact lens 8 retained in the contact lens holder 1.

Once the contact lens 8 is placed in the contact lens holder 1 with the upper cover 2 locked on the casing 3, the contact lens 8 can immovably be retained against any lateral and vertical motion with respect to the contact lens holder 1. For measurement, the contact lens holder 1 is interposed between the lens presser 13 and the lens support 12 with the center of the contact lens 8 being aligned with a beam of light used for measurement. The contact lens 8 thus installed will stationarily be held in the contact lens holder 1 even if subjected to shocks or vibrations. The contact lens 8 will be protected against any warpage or distortion which would result from application of forces thereon. Therefore, the contact lens 8 can be measured with precision. The contact lens holder 1 which is supported between the lens presser 13 and the lens support 12 allows the operator's both hands to be available freely for various manual procedures other than holding the contact lens 8. With the contact lens holder 1 used, the lens support of a hand-held lens meter does not need to be kept horizontally, with the result that such a hand-held lens meter can be handled with ease.

Although a certain preferred embodiment of the invention has been shown and described in detail, it should be understood that various changes and modifications may be made therein without departing from the scope of the appended claims.

What is claimed is:

1. A contact lens holder for use between the lens presser and lens support of a lens meter for measurement of a contact lens, comprising a cover and a casing which are openably joined to each other, said casing having a leg adapted to support said lens holder on the lens support of said lens meter, said cover and said casing having first and second aligned openings, respectively, for passage therethrough of a beam of light emitted from the lens meter, said casing having an annular wall which defines said second opening and has a diameter which is less than the diameter of the contact lens to be measured, said annular wall adapted to engage the concave side of the contact lens and support the contact lens with the concave side thereof directed toward said second opening, an annular projection surrounding said annular wall in spaced relation thereto, said annular projection having a diameter such that it engages the peripheral edge of the contact lens to assure the proper positioning of the contact lens with respect to said lens meter and prevent lateral movement of said contact lens, and said cover having a plurality of angularly spaced resilient tongues attached in a cantilevered fashion to said cover for engaging the convex side of the contact lens to resiliently hold the contact lens against said annular wall to prevent movement of the contact lens axially of said first and second openings, whereby said contact lens is accurately positioned with respect to said lens meter and prevented from movement in the vertical or horizontal directions.

2. A contact lens support according to claim 1 which further comprises a hinge for coupling said cover and said casing to each other, a hook positioned on said cover in diametrically opposite relation to said hinge, a locking projection positioned on said casing, said hook being snappingly engageable to said locking projection to couple said cover to said casing.

* * * * *